May 21, 1940.  F. TURRETTINI  2,201,934
SCREW SPINDLE RELIEVING DEVICE
Filed June 19, 1937   3 Sheets-Sheet 1
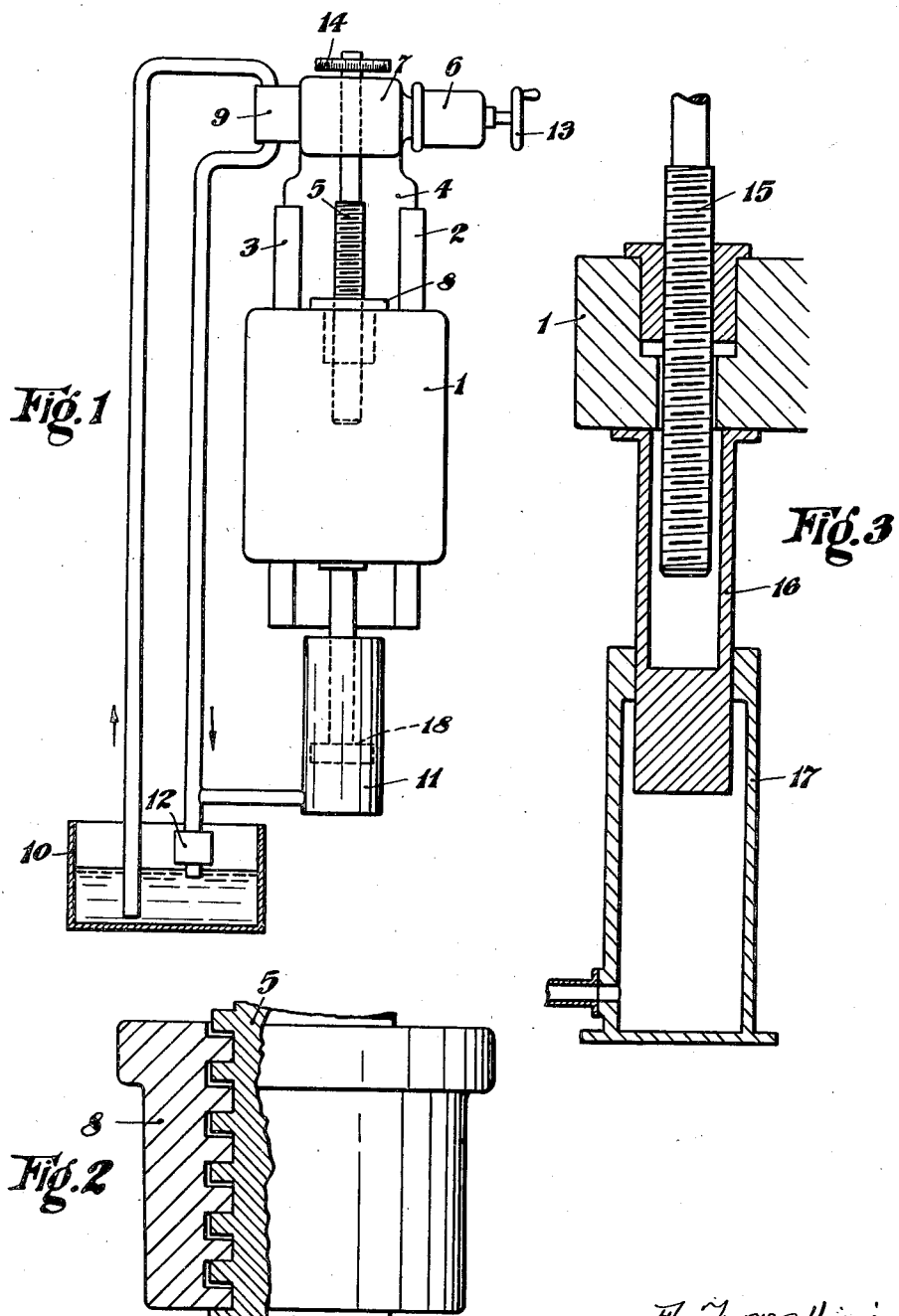
F. Turrettini
INVENTOR
By: Glascock Downing & Seebold
Attys.

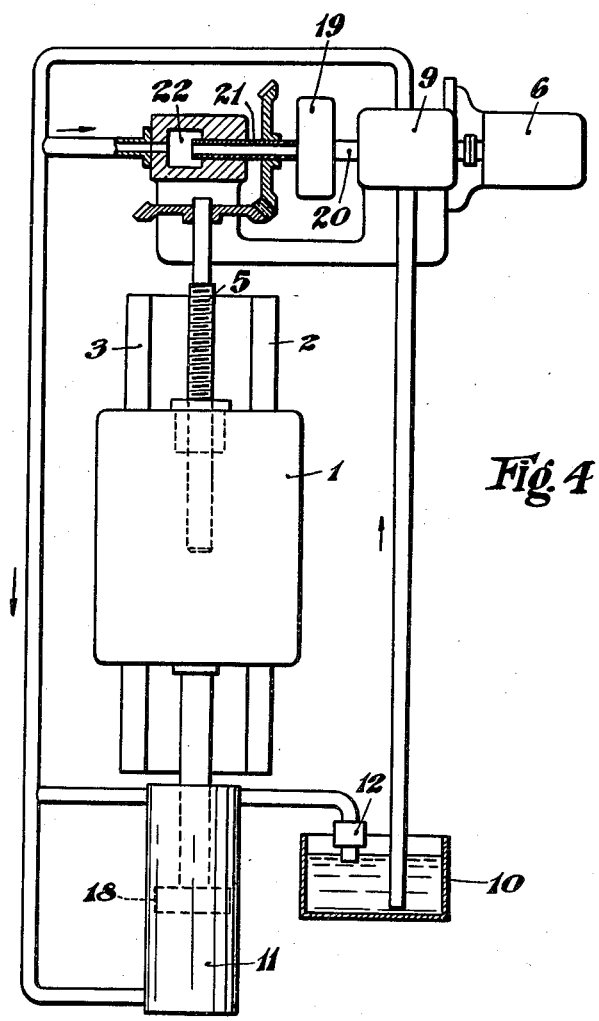

Patented May 21, 1940

2,201,934

UNITED STATES PATENT OFFICE 2,201,934

SCREW SPINDLE RELIEVING DEVICE

Fernand Turrettini, Bellevue-Geneva, Switzerland, assignor to the firm Societe Genevoise d'Instruments de Physique, Geneva, Switzerland, a firm of Switzerland Application June 19, 1937, Serial No. 149,255
In Switzerland July 3, 1936

3 Claims. (Cl. 77—36)

This invention relates to devices for relieving a precision screw spindle from efforts acting thereon during operation of the spindle for displacing a movable member.

Precision screw spindles are frequently used in machine-tools, such as drilling, boring, milling or like machine-tools, for moving work tables, tool-carrying heads, or other slides of machine-tools and for measuring the displacement of such slides. The effort required for moving the slides subjects the spindle to considerable stress and accordingly produces wear of the screw thread which is detrimental for the precision of the screw.

The present invention has as its object the provision of a device for relieving the thread of screw spindles from the efforts acting thereon during operation of the spindle for displacing a movable member. According to the invention said member is connected to the cylinder or piston of a hydraulic power transmitter controlled by the spindle drive so that pressure liquid is fed to the cylinder during rotation of the spindle, in order to create, upon displacement of said member, a relieving force corresponding in magnitude to the efforts exerted by the member on the spindle but acting in opposition thereto.

The accompanying drawings represent by way of example several embodiments of the present invention, as applied to the tool-carrying slide of a vertical milling machine.

Figure 1 is a general diagrammatic view of the relieving device according to the invention.

Figure 2 shows a detail part thereof.

Figure 3 shows a modification of a detail.

Figures 4 and 5 represent each a modified arrangement of a relieving device.

Figure 5:
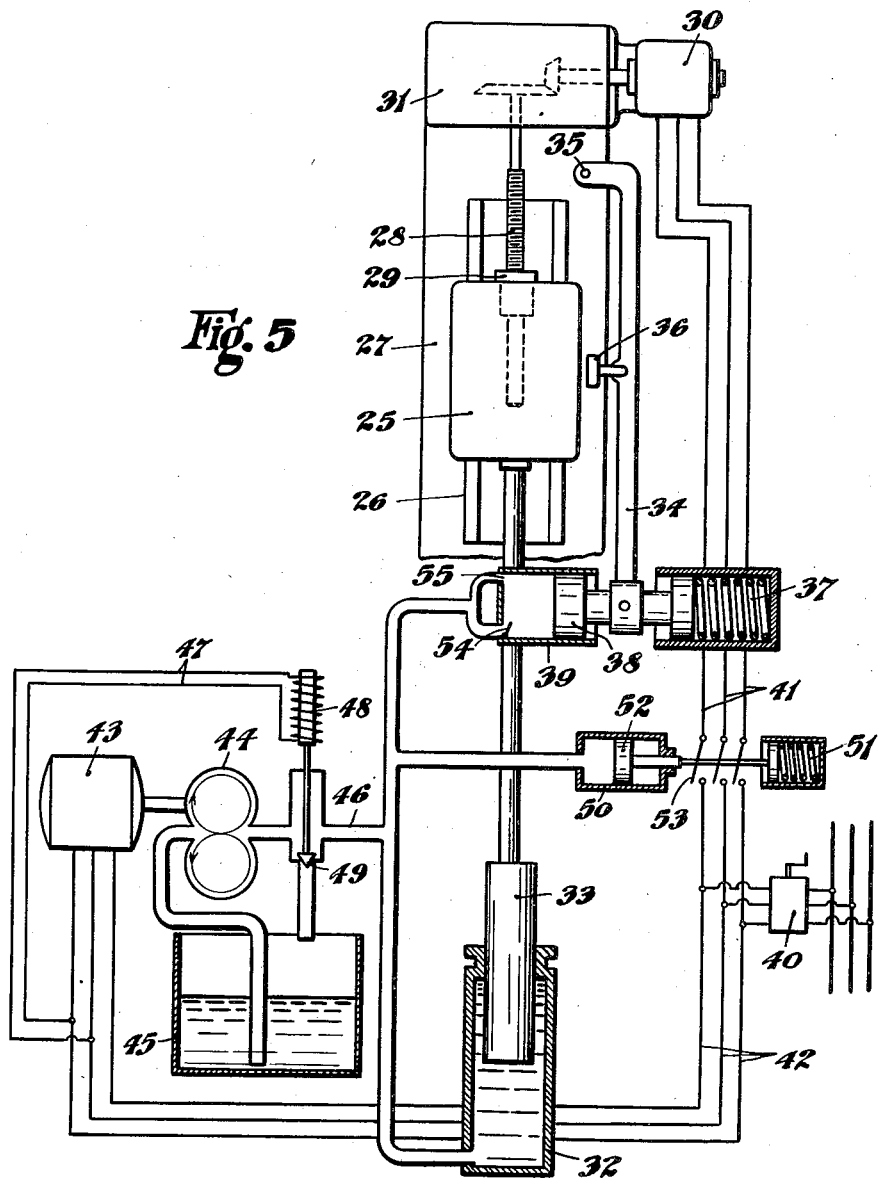

Referring to Figure 1, I indicates a vertical slide movable with great precision along guideways 2 and 3 of the machine frame 4. Movement of the slide is effected by means of a micrometer screw 5 turning in a nut 8 fixed to the slide and actuated by an electric motor 6 by means of gears, not shown, lodged in a casing 7. The electric motor 6 drives also a pump which draws liquid from a reservoir 10 and delivers it into a cylinder 11 of a hydraulic power transmitter the piston 18 of which is connected to the slide 1. The pressure within the cylinder can be regulated by means of a discharge valve 12.

When the slide 1 does not move, that is to say, when it has been brought to the desired precise position, the weight of the slide produces contact between the lower flanks of the thread of the nut 8 and the upper flanks of the thread of the screw 5, the slide being suspended on the screw as shown in Fig. 2, because when the drive motor stops no pressure exists in the cylinder 11 owing to natural leaks. When the motor 6 is actuated, the screw 5 turns and at the same time the pump 9 generates in the cylinder 11 sufficient pressure to exert on the slide 1 a relieving force tending to push the slide upwardly and which is slightly greater than the weight of the slide. The upper flanks of the thread of the nut 8 then make contact with the lower flanks of the thread of the screw 5, and accordingly those flanks which do not determine the position of the slide at a stop are slightly subjected to wear during movement of the slide.

The adjustment of the slide to exact position will be made by hand by means of the wheel 13 and by reading the divided drum 14; these adjustments which are of feeble amplitude and effected at very small speed produce no wear of the flanks in contact, so that a relieving force is not necessary during fine-adjustment.

When the precise position of the slide must be maintained during its movement, the valve 12 will be adjusted so that the screw 5 is subjected to a very small effort only, and so that the resulting force of the weight of the slide 1 and of the action of the cylinder 11 is downwardly directed; in this manner, during movement of the slide the pressure between the flanks of the screw and those of the nut is very small, while when the slide stops, the entire weight of the slide acts to ensure high precision of the position of the slide by a strong contact between the flanks.

The pump 9 will be arranged in such manner that the relieving force will be created during both directions of rotation of the screw 5, that is to say, as well during the downward movement as during the upward movement of the slide.

The slide could also move in horizontal direction, and the relieving force created by the hydraulic device would then principally serve to overcome the friction or the cutting efforts of the tools acting on the slide.

Figure 3 shows a modification which is particularly useful when the course of the slide is great. The screw 15, coaxial with the piston 16 of the cylinder 17, penetrates in a lodgement provided in the piston.

In the form of embodiment of Figure 1 it may happen that the pressure in the cylinder 11 is only established when the screw 5 has already commenced to turn, in other words, that the relieving force exerted on the slide is only created after this latter has started to move. The modification of Fig. 4 has an object to overcome this inconvenience. In this modification, the motor 6 directly actuates the pump 9 and is connected to the screw 5 by the intermediary of a hydraulic clutch 19 which is not represented in detail and which, when it is engaged, connects the shaft 20 of the motor with the shaft 21 geared to the screw 5. The hydraulic clutch 19 may be of any conventional design, for example of the general kind of that described in Swiss Patent No. 116,199, according to which an expansible clutch member rigid with the driven shaft and responsive to fluid pressure, is brought into frictional engagement with a clutch member turning with the driving shaft, when sufficient pressure has been created within the expansible member; for this purpose the shaft 21 is hollow and connected by a chamber 22 with the pressure conduit of the pump 9. When the motor 6 starts to turn, the pump 9 operates and creates first the desired pressure in the cylinder 11 for relieving the slide. Only when this pressure exists, the clutch 19 is engaged and connects the screw 5 to the motor 6, so that this latter starts to turn only after the thread of the screw has been relieved.

In Figure 5 the vertical slide 25 of a machine tool moves along guideways 26 of the frame 27. Vertical adjustment of the slide is effected by the micrometer screw 28 turning in a nut 29 carried by the slide. The screw is connected by means of gears lodged in a casing 31 to an electric motor 30. Below the slide is installed a hydraulic relieving mechanism comprising a cylinder 32 and a piston 33 the rod of which is fixed to the slide 25. A lever 34 has one end pivoted at 35 on the frame 27 and carries a brake shoe 36. The other end of the lever is connected to an actuating device comprising a spring 37, which constantly tends to apply the brake 36 against the slide 25 for locking this latter, and a piston 38 moving within the cylinder 37 and subjected to hydraulic pressure acting against the spring 37.

An electric commutator 40 connects two series of conductors 41 and 42 to an electric current supply. The conductors 41 feed the motor 30 and the conductors 42 feed a motor 43 which drives a pump 44. This latter draws liquid from a reservoir 45 and delivers it in the conduit 46 connected to the two cylinders 32 and 39. When the motor 43 is started, a circuit 47 excites a coil 48 which produces the closure of a valve 49 controlling an exhaust conduit which connects the delivery conduit 46 to the reservoir 45. This delivery conduit is also connected to a cylinder 50 in which moves a piston 52 against a spring 51, which piston controls a switch 53 placed in the conduits 41 feeding the motor 30.

When the commutator 40 is closed, the switch 53 first stays open so that the motor 30 does not start, the valve 49 is closed, the motor 43 starts and actuates the pump 44 which delivers liquid under pressure in the cylinder 32; the relieving force is thus created and the piston 33 supports the weight of the slide 25; shortly afterwards the piston 38 is moved against the spring 37 and the brake 36 is removed from the slide; a moment later, the piston 52 moves against the action of the spring 51 and closes the switch 53; the motor 30 then starts to turn and drives the screw 28 which in turn moves the slide.

When the current supply is switched off by the commutator 40, the two motors 30 and 43 stop immediately; the valve 49 opens and the delivery conduit 46 communicates with the atmosphere; the cylinder 32 is exhausted and the piston 33 no longer supports the weight of the slide 25; the piston 52 returns to its original position and opens the switch 53; slightly afterwards the piston 38 returns to its original position and the brake 36 is again applied on the slide and locks it in the position in which it has been moved by the screw.

In order to produce a slow return of the piston 38 to its original position, different devices may be used. In the drawings the cylinder 39 is connected to the delivery conduit 46 by means of two conduits, one of which is of large cross section and contains a non-return valve 54 which closes when the liquid must escape from the cylinder; the return of the piston 38 to the position in which it applies the brake 36 is accordingly slowly effected only owing to the conduit 55 of small cross section.

The motor 30 can be started in one direction or in the other, according to the direction in which the commutator 40 is moved, while the motor 43 or the pump 44 are so arranged, that their operation is independent from the direction in which the commutator 40 has been switched in.

I claim:

1. A relieving device for a screw spindle on which is displaced a movable member, a nut fixed to said member and operatively engaging the screw thread of said spindle, a motor for displacing said member on the screw spindle, intermediate movement transmitting means, a hydraulic power transmitter operatively connected to said member and adapted to transmit a relieving force thereto, a pump automatically actuated when said member shall be displaced feeding pressure fluid to said power transmitter, and fluid pressure responsive means adapted to cause said member to be displaced only upon pressure fluid being supplied to said hydraulic power transmitter.

2. A relieving device for a screw spindle displacing a movable member, a nut fixed to said member and operatively engaging the screw thread of said spindle, a motor for imparting rotation to the screw spindle so as to displace said member on said spindle, intermediate rotation transmitting means between said motor and said spindle, a hydraulic power transmitter having a cylinder and a piston slidable therein and operatively connected to said member for transmitting a relieving force thereto, a pump operated by said motor for feeding pressure fluid to said cylinder, and a fluid pressure controlled clutch interposed between said motor and said rotation transmitting means and establishing a driving connection therebetween only upon the hydraulic power transmitter being set under pressure.

3. A relieving device for a screw spindle displacing a movable member, a nut fixed to said member and operatively engaging the screw thread of said spindle, a motor for imparting rotation to the screw spindle so as to displace said member on said spindle, intermediate rotation transmitting means between said motor and said spindle, a hydraulic power transmitter operatively connected to said member and adapted to transmit a relieving force thereto acting in opposition to the efforts exerted by the member on the screw spindle, a pump automatically actuated when said member shall be displaced feeding pressure fluid to said power transmitter during rotation of the screw spindle, fluid pressure responsive control means for said motor to effect rotation of said spindle only upon pressure fluid being supplied to said hydraulic power transmitter, a locking brake coacting with said member, and fluid pressure responsive means for operating said brake to effect release of said member upon pressure fluid being supplied to the hydraulic power transmitter but before the screw operating motor is started and to lock said member when the power transmitter is inactive.

FERNAND TURRETTINI.